Patented Apr. 4, 1944

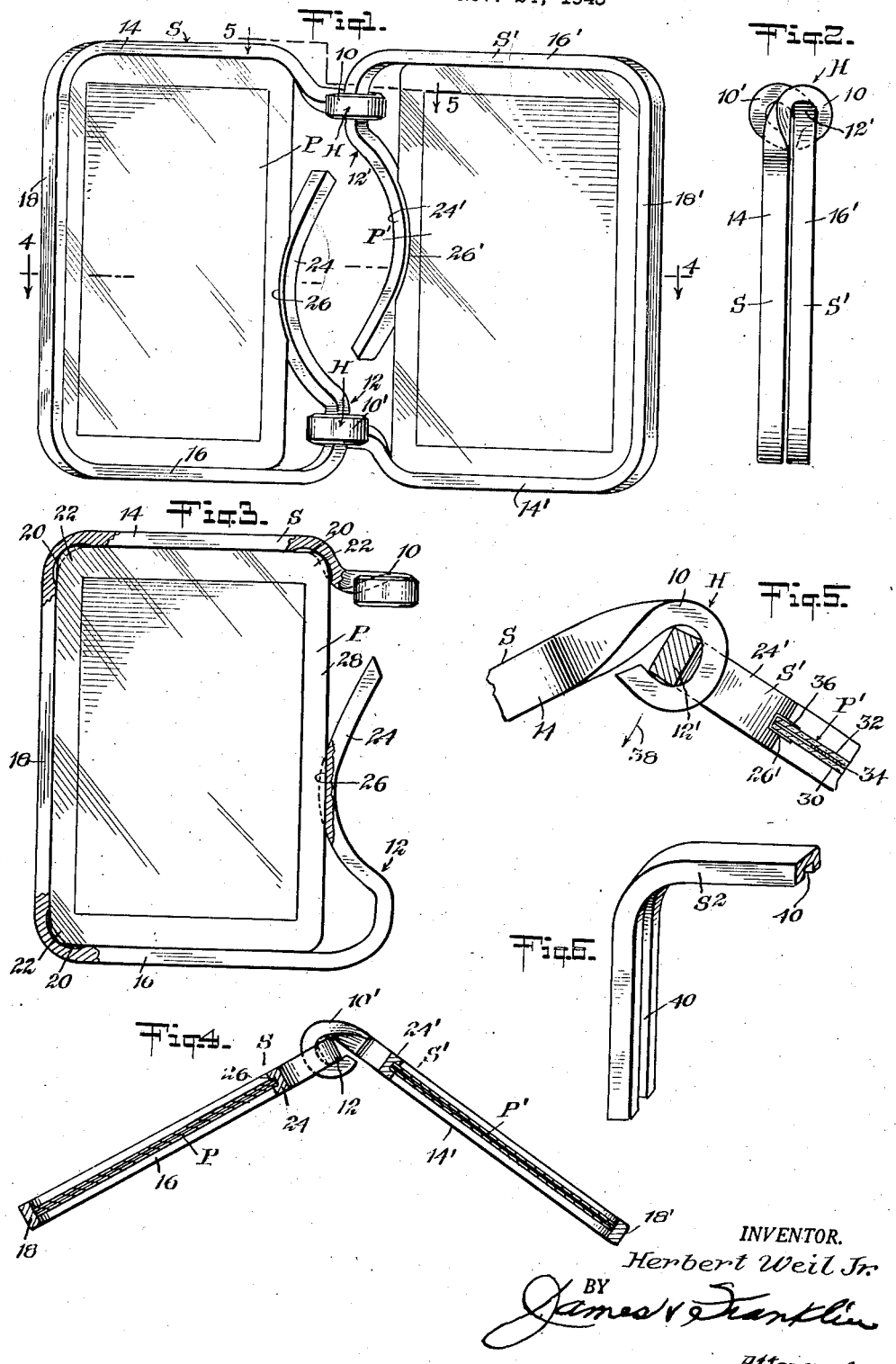

2,345,719

UNITED STATES PATENT OFFICE 2,345,719

FOLDABLE PLASTIC PICTURE FRAME

Herbert Weil, Jr., New York, N. Y., assignor to Celomat Corp., New York, N. Y., a corporation of New York Application November 24, 1943, Serial No. 511,528

8 Claims. (Cl. 40—155)

This invention relates to a novel picture frame of the foldable or collapsible type.

The prime object of my present invention centers about the provision of an all-plastic foldable or collapsible picture frame, possessing the following characteristics or features:

(1) The picture frame, of the book type, comprises a pair of hingedly related frame sections movable about a hinge connection between open and closed picture frame positions, all of the parts of the frame sections including the hinge structure being made of a plastic material.

(2) Each of the two sections of the picture frame consists of a one-piece member made of a plastic material; the two sections may be made identical in structure and form, so designed that two similar or identical sections may be readily assembled to form the book type of picture frame.

(3) The structure of each frame section is such that picture containing plaques may be easily and conveniently set into or removed from the frame without the use of any attaching or securing elements, the resiliency of the constructed parts being relied upon to permit rapid attachment or detachment of the picture containing plaques.

(4) The frame sections are furthermore so designed and constructed that the sections when moved to closed or open positions will automatically hold or retain such positions; and (5) The frame structure is such that attractive and modernistic picture frame designs may be produced.

To the accomplishment of these objects and such other objects as may hereinafter appear, my invention is directed to a foldable picture frame as sought to be defined in the appended claims and described in the following specification taken together with the accompanying drawing in which:

Fig. 1 is a front elevational view of the picture frame of my present invention showing the same in open position;

Fig. 2 is a top plan view thereof showing the same in closed position;

Fig. 3 is an elevational view with parts shown in section of one of the frame sections of the foldable picture frame;

Fig. 4 is a view taken in section in the plane of the line 4—4 of Fig. 1;

Fig. 5 is a view shown to an enlarged scale of a fragment of the picture frame, particularly a hinge part thereof, taken in section in the planes of the broken line 5—5 of Fig. 1; and Fig. 6 is a view of a fragment of a picture frame section showing a modification thereof.

Referring now more in detail to the drawing, the foldable picture frame of the invention comprises a pair of hingedly related picture frame sections S and S', each section consisting of a one-piece plastic picture encasing frame member adapted to removably receive the picture containing plaque P, the two sections S and S' being movable about a hinge connection generally designated as H, in book type fashion, between the open picture frame position as shown in Figs. 1, 4 and 5 of the drawing, and the closed picture frame position shown in Fig. 2 of the drawings. All of the parts of each of the picture frame sections S and S', including its component of the hinge connection H, consist of or are formed into a single piece or unit; and two such unit sections are assemblable as best shown in Fig. 1 of the drawing to form the completed foldable picture frame.

The two picture frame sections S and S' may be made identical in structure and form, in the form shown in Fig. 3 of the drawing; and two of such identically constructed sections, one turned 180 degrees about a medial horizontal axis with reference to the other, may be assembled and interlocked to produce the frame shown in Fig. 1 of the drawing. Therefore, a specific description of the single section S shown in Fig. 3 may be taken as a description of either section S or S'.

The frame section S comprises a frame member encasing the plaque P but open along its hinging side, the frame member terminating at the open side at one frame end in a hinge piece 10 and at the other frame end in a hinge pintle 12. The hinge piece 10 may be made into a hinge loop as shown, formed in a plane normal to the plane of the frame member S, while the hinge pintle 12 may also be made into a part loop formed in a plane coincident with the plane of the frame member S. The frame section may be given any desired contour and as shown it may comprise a rectangular configuration adapted to encase a correspondingly contoured plaque P; and in such case the frame member S is formed to provide the top and bottom pieces 14 and 16 and the connecting side piece 18, the hinge piece 10 being a continuation at the free end of the top piece 14, while the hinge pintle 12 is a continuation of the free end of the bottom piece 16.

The frame section S may be made of or molded into rectangular sectioned stock as shown particularly in Figs. 4 and 5 of the drawing, the hinge loop 10 being produced by the loop and right angle twist of the stock as best indicated in Fig. 5 of the drawing. For receiving and holding the plaque P the frame member S is grooved on its inside face and for this purpose the frame member may be provided on its inside face with the corner positioned grooves 20, 20 (see Fig. 3) for seating the corners 22, 22 of the picture plaque P. The hinge pintle 12 preferably includes a reversely bent extension piece 24 which is engageable with the plaque P at the open side of the frame member, and this extension piece 24 may also be provided with a groove such as 26 for seating the side edge 28 of the plaque P. Since the picture section S' embodies the same structure, the parts thereof are designated by the same but primed reference characters.

The two frame sections S and S' are assembled by threadedly inserting the hinge pintle of each frame section into the hinge loop of the mating section, both hinge pintles being at the same time threadedly inserted into their mating hinge loops as will be evident by viewing Fig. 1 of the drawing. The extension pieces 24 and 24' being open and extended, are resilient enough to permit this threading action to take place; and being so resilient, the parts when assembled assume their normal condition as shown in Fig. 1 of the drawing.

A preferred plastic used is a methyl methacrylate resin known as "Lucite." By the use of such a resin, the open frame section produced is not only desirably resilient, but is transparent, thus enhancing the design or decorative effect of the frame. The plaques P, P may be inserted in the frame sections S and S' before or after the frame sections are assembled to produce the picture frame. Due to the open end of each section, the resiliency of the parts thereof and particularly the resiliency of the extension piece 24, the plaque P may be readily sprung into and out of its frame encasing position. The plaque P as shown in Fig. 5 may consist of two plates 30, 32 which may be made of sheet Lucite, holding therebetween any picture or photograph 34, and this assembly may be held together by a piece of tape 36. The plaque assembly may be readily received by or removed from the frame section by outwardly forcing or springing the extension 24 and by then releasing the same, the plaque being held or retained in the grooved parts of the frame member.

The parts of the frame sections may also be constructed so that the frame sections S and S' will hold or retain both their closed and open book positions. This may be accomplished by the configuration that is imparted to the elements of the hinge structure. To this end the loop 10 may be elongated or made generally elliptical in one direction, in the direction indicated by the arrow 38 (Fig. 5). The mating hinge pintle 12' is also shaped so as to be elongated in the same direction (Fig. 5). The resiliency of the hinge loop 10 permits the ready rotation of the hinge pintle therein, and with the parts elongated as described, the sections S and S' will hold or maintain the open position best shown in Fig. 5 of the drawing, this retained open position being determined by the coaxial positioning of the major axes of the loop 10 and the hinge pintle 12'. In the picture closed position shown in Fig. 2, the major axis of the pintle is coincident with the minor axis of the loop, with the result that the sections also tend to remain held in their closed positions.

In Fig. 6 of the drawing, a modification of the structure is shown in which the grooves on the inside face of the frame member are made continuous at least for the three enclosing sides of the frame. Here a frame member such as $S^2$ is provided on its inside face with a continuous plaque seating groove 40.

The manner of making, assembling and using the book folding picture frame of my present invention and the advantages thereof will in the main be fully apparent from the above detailed description thereof. An all-plastic picture frame is produced. Each section of the picture frame consists of a one-piece member made of a plastic material. The double hinge provided by the two picture frame sections are also plastic made and are integral parts of the frame members. Two like picture sections may be readily assembled to produce the resulting product. Picture receiving plaques may be quickly assembled with or disassembled from the picture frame members. Pictures may be easily mounted in the frame without the use of any attaching or securing elements of any kind. The frame sections may be readily moved between their open and closed positions and the sections will retain or hold these positions. The frames may be made in any size and may be so sized that when collapsed, may be conveniently carried in the pocket or in a pocket-book. The designs producible by dint of the structure are all attractive and modernistic.

While I have shown the invention in the preferred forms, it will be understood that changes may be made in the structure thereof without departing from the spirit of the invention defined in the following claims.

I claim:

1. A foldable picture frame made of a plastic material comprising a pair of hingedly related picture frame sections, each section consisting of a one-piece plastic picture encasing frame member open along one side and terminating at the open side in a hinge piece at one frame end and a hinge pintle at the other frame end, the hinge piece of each section being interlockable with a hinge pintle of the mating section producing a double hinge connection for the two sections, the two sections being movable about said hinge connection between open and closed picture frame positions.

2. A foldable picture frame made of a plastic material comprising a pair of hingedly related picture frame sections, each section consisting of a one-piece plastic picture encasing frame member open along one side and terminating at the open side in a hinge piece at one frame end and a hinge pintle at the other frame end, both sections having the same structure and form but arranged one with its hinge piece on top and the other with its hinge piece on bottom, the hinge piece of each section being interlockable with a hinge pintle of the mating section producing a double hinge connection for the two sections, the two sections being movable about said hinge connection between open and closed picture frame positions.

3. A foldable picture frame made of a plastic material comprising a pair of hingedly related picture frame sections, each section consisting of a one-piece plastic picture encasing frame member open along one side and terminating at the open side in a hinge piece at one frame end and a hinge pintle at the other frame end, the hinge piece and the hinge pintle comprising integral loops formed respectively in planes normal to and coincident with the plane of its frame member, the hinge piece of each section being interlockable with a hinge pintle of the mating section producing a double hinge connection for the two sections, the two sections being movable about said hinge connection between open and closed picture frame positions.

4. A foldable picture frame made of a plastic material comprising a pair of hingedly related picture frame sections, each section consisting of a one-piece plastic picture encasing frame member open along one side and terminating at the open side in a hinge piece at one frame end and a hinge pintle at the other frame end, the hinge piece of each section being interlockable with a hingle pintle of the mating section producing a double hinge connection for the two sections, the two sections being movable about said hinge connection between open and closed picture frame positions, and a pair of picture plaques, each removably receivable by one of the picture frame members.

5. A foldable picture frame made of a plastic material comprising a pair of hingedly related picture frame sections, each section consisting of a one-piece plastic picture encasing frame member open along one side and terminating at the open side in a hinge piece at one frame end and a hinge pintle at the other frame end, the hinge piece and the hinge pintle comprising integral loops formed respectively in planes normal to and coincident with the plane of its frame member, the frame member being grooved on its inside face, the hinge piece of each section being interlockable with a hinge pintle of the mating section producing a double hinge connection for the two sections, the two sections being movable about said hinge connection between open and closed picture frame positions, and a pair of picture plaques, each removably receivable by one of the picture frame members and held by the grooves therein.

6. A foldable picture frame made of a plastic material comprising a pair of hingedly related picture frame sections, each section consisting of a one-piece plastic picture encasing frame member open along one side and terminating at the open side in a hinge loop at one frame end and a hinge pintle at the other frame end, the hinge loop of each section being interlockable with a hinge pintle of the mating section producing a double hinge connection for the two sections, the hinge loop being generally elliptical, and the hinge pintle being elongated in cross-section, the two picture frame sections being movable about said hinge connection between open and closed picture frame positions, the open position being determined by the coaxial positioning of the major axes of loop and pintle.

7. A foldable picture frame made of a plastic material comprising a pair of hingedly related picture frame sections, each section consisting of a one-piece plastic picture encasing frame member open along one side and terminating at the open side in a hinge piece at one frame end and a hinge pintle at the other frame end, a picture plaque removably receivable by said frame member, the said hinge pintle including an extension piece engageable with the plaque at the open side of the frame member, the hinge piece of each section being threadedly interlockable with a hinge pintle and its extension piece of the mating section producing a double hinge connection for the two sections, the two sections being movable about said hinge connection between open and closed picture frame positions.

8. For a foldable picture frame made of a plastic material, a frame section consisting of a one-piece plastic picture encasing frame member open along one side and terminating at the open side in a hinge piece at one frame end and a hinge pintle at the other frame end, the hinge pintle including a plaque engaging extension piece, two of such sections being connectable by threading and interlocking the hinge piece of one section with a hinge pintle of another section, producing a double hinge foldable picture frame the two sections of which are movable about said hinge connection between open and closed picture frame positions.

HERBERT WEIL, Jr.